Nov. 19, 1940. B. C. BOECKELER 2,222,559
METHOD OF TREATING FEED WATER
Filed Feb. 23, 1938
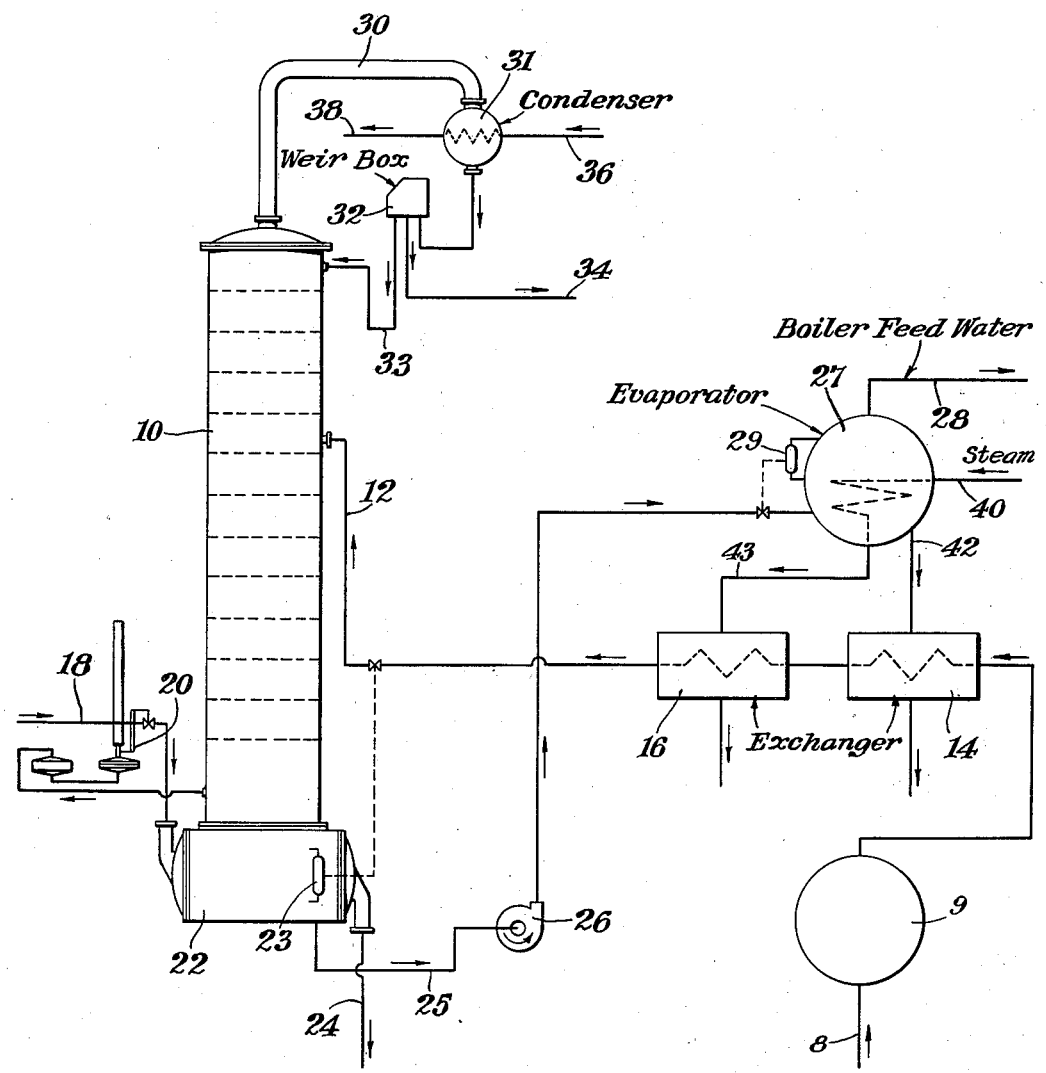
INVENTOR
B. Clark Boeckeler
BY Nathaniel Ely
ATTORNEY Patented Nov. 19, 1940

2,222,559

UNITED STATES PATENT OFFICE 2,222,559

METHOD OF TREATING FEED WATER

Benjamin Clark Boeckeler, New York, N. Y., assignor to The Lummus Company, New York, N. Y., a corporation of Delaware Application February 23, 1938, Serial No. 191,862

3 Claims. (Cl. 202—39)

This invention relates to an improvement in distillation and specifically to the removal of small amounts of impurities from large volumes of water, such as the removal of ammonia from boiler feed water.

It is well known that in modern boiler plant operation, in which the water circulates in a closed cycle with a small percentage of make-up water, the continual concentration of the impurities, such as ammonia, often reaches a point at which serious corrosion takes place in the condensers and in other apparatus containing copper. If the feed water has as much as twenty parts per million of free ammonia, continued operation soon raises this to an undesired point. However, the large volume of water to be treated and the relatively small proportion of ammonia therein, makes it a relatively difficult matter to economically reduce it to a relatively small and safe amount, such as .005 part per million or 5 parts per billion.

The principal object of this invention is to provide a continuous distillation process for continuously removing relatively small proportions of impurities form large volumes of water and to do this in an economical manner with a relatively small expenditure for equipment or treatment.

Another and more specific object of the invention is to provide an improved arrangement for increasing the volatility of ammonia in water and to make possible the substantially complete removal of the ammonia where it occurs in boiler feed water.

A further object of the invention is to provide a process for the removal of small concentrations of ammonia in boiler feed water together with the removal of other objectionable materials which hinder the driving off of the ammonia by the evaporation and distillation of the water in which the water is removed as an overhead product in one instance and as a bottoms product in another.

Further objects and advantages of the invention will appear from the following description of a preferred form of embodiment of the invention taken in connection with the attached drawing which is illustrative thereof, such drawing being a flow diagram of one preferred arrangement of the apparatus by which the invention may be realized.

In accordance with the preferred form of embodiment of my invention, the large volume of water to be purified of relatively small volumes of impurities, is introduced into the fractionating column 10 through the inlet pipe 12. While this water may be of any type and for any subsequent use, the invention is more specifically applicable to the removal of ammonia from boiler feed water in cases such as where the boiler feed water has ammonia in it in the range of twenty parts per million. It will be apparent that the following method of removal of ammonia from water, could be applied to other products containing impurities of similar characteristics in equivalent concentrations without departing from the invention.

Prior to entering the fractionating tower 10, this boiler feed water may be suitably heated in the heat exchangers 14 and 16 to raise it to a point near the vaporizing temperature and the water which enters at 8 may be treated at 9 with alkali or by other materials to increase the volatility of the ammonia, or may be evaporated to remove the non-volatile impurities. The initial treatment with an alkali, such as NaOH or Ca(OH)$_2$, tends to increase the volatility of the ammonia due to the increase of the concentration of the OH ion.

Upon entering the fractionating tower 10, which is maintained at an elevated temperature, a part of the water and ammonia will be vaporized passing off overhead through the vapor pipe 30 into the condenser 31 with a substantial amount of reflux discharging from the weir box 32 through the reflux pipe 33 back into the fractionating tower. The continued reflux action which is countercurrent to the ascending vapors will bring about a stripping action with the substantially ammonia-free water falling to the bottom and being discharged through the pipe 25. This reflux action tends to concentrate the ammonia at the top of the tower and a part of it is continuously withdrawn from the weir box through the discharge 34, which is the rejected material. The condenser may be cooled by any suitable medium entering at 36 and discharging at 38.

The ammonia-free water, which is discharged at 25, may be conveniently pumped at 26 to an evaporator 27 for a further treatment. Steam enters the evaporator at 40 and, in this case, the vapor discharged at 28 becomes the boiler feed water when condensed. This is freed of both the ammonia as well as the non-volatile substances. The discharge 42 from the evaporator 27 contains the non-volatile materials and, if desired, these may be drawn through the heat exchanger 14 to give up a part of their heat. The steam condensate from the evaporator discharges at 43 and passes through heat exchanger 16 and then may be used for any suitable purpose such as boiler feed water, if it is of the desired quality.

The heating of the fractionating tower may be by any available heat interchange, but it is preferably by steam through the pipe 18 which is controlled by the pressure control 20, such steam entering the reboiler 22 in heat exchange relation with the ammonia-free water at the bottom. It will be understood, however, that the steam, if of a suitable quality, may enter the fractionating tower 10 direct and become intermixed with the water to be treated and be discharged at 25 with the ammonia-free water. If the steam is conducted through the reboiler 22, as shown, the condensate will be discharged at 24 for any suitable further use.

A flow balance is maintained by the liquid level control 23 and liquid level control 29. As the liquid level falls in the evaporator 27, due to the withdrawal of boiler feed water, the liquid level control 29 opens up the discharge pipe 25 which in turn draws on the water carried in the bottom of the fractionating tower 10, and this in turn affects the liquid level control 23, which regulates the incoming water in the line 12. Accurate control is therefore maintained automatically.

A typical quantitative analysis of the apparatus is as follows:

Assuming an inflow of feed water, 10,200 pounds containing 20 parts per million of free ammonia, there will be approximately 200 pounds of reject at 34 containing approximately 100 parts per million of free ammonia and the desired end product at 28 will consist of 10,000 pounds of feed water having about .005 part per million of free ammonia. This will require about 4,000 pounds of steam, the heat of which is recovered in heating the feed water to the maximum degree.

If it is undesirable or inconvenient to treat the incoming water with an alkali, it is possible to first evaporate the water which will remove from the water the non-volatile ions of calcium, sodium, sulphates and chlorides which tend to interfere with the vaporization of the ammonia. By initially evaporating the water and removing it as an overhead and then introducing the product into the stripping column, substantially similar results will be obtained and final evaporation will be unnecessary. It is important, however, that the water be treated both by evaporating and stripping or alkali treating and stripping, or by stripping and evaporating or by other combinations of stripping and evaporating and alkali treatment in order that the ammonia be completely released and separately discharged and the non-volatile ions also separately discharged. The process can be carried out continuously and automatically with a minimum cost of equipment and a relatively low cost of utilities. The resultant product is satisfactory for boiler feed and will not cause objectionable reactions on power plant equipment.

While I have described a preferred embodiment of my invention, I am aware that other modifications may be made thereto and I therefore desire a broad interpretation of my invention within the scope and spirit of the description herein and the claims appended hereafter.

I claim:

1. The method of rendering feed water containing small quantities of ammonia applicable for use in a closed system which includes the steps of heating the feed water to its boiling point, adding an alkali thereto to increase the volatility of the contained ammonia, fractioning the heated feed water and removing the ammonia as overhead and passing the ammonia-free, heated feed water to a source of steam generation.

2. The method of rendering feed water containing small quantities of ammonia applicable for use in a closed system and thereby reducing the ammonia concentration from the order of 20 part per million to the order of 5 part per billion, which includes the steps of heating the feed water to its boiling point, adding an alkali thereto to increase the volatility of the contained ammonia, fractioning the heated feed water and removing the ammonia as overhead and immediately passing the ammonia-free heated feed water to a source of steam generation.

3. The method of continuously rendering boiler feed water applicable for use in a closed system of steam generation, said feed water containing a small quantity of ammonia, a portion of which is in the form of fixed ammonium salts, the ammonia in the system being maintained at a concentration as low as five parts per billion to avoid corrosion of parts of the system, which method comprises subjecting the boiler feed water to evaporation in an evaporation zone to separate out the fixed ammonium salts from the water containing free ammonia, thereafter fractionating the water containing free ammonia in a fractionation zone separate from the evaporation zone, removing as the net overhead therefrom a relatively small stream comprising water containing substantially all the ammonia, removing as the bottoms therefrom a relatively large stream comprising water substantially free of ammonia, and passing the ammonia-free heated water to the steam generation system.

B. CLARK BOECKELER.